(12) United States Patent
Ishino et al.

(10) Patent No.: US 11,134,803 B2
(45) Date of Patent: Oct. 5, 2021

(54) ORDERED FOOD AND DRINK CONVEYING APPARATUS

(71) Applicant: Ishino Seisakusho Co., Ltd., Ishikawa (JP)

(72) Inventors: Haruki Ishino, Ishikawa (JP); Kenji Watanabe, Ishikawa (JP); Tetsuji Kitamura, Ishikawa (JP)

(73) Assignee: Ishino Seisakusho Co., Ltd., Ishikawa (JP)

( * ) Notice: Subject to any disclaimer, the term of this patent is extended or adjusted under 35 U.S.C. 154(b) by 129 days.

(21) Appl. No.: 16/499,896

(22) PCT Filed: Jun. 21, 2019

(86) PCT No.: PCT/JP2019/024780
§ 371 (c)(1),
(2) Date: Oct. 1, 2019

(87) PCT Pub. No.: WO2020/161933
PCT Pub. Date: Aug. 13, 2020

(65) Prior Publication Data
US 2021/0177179 A1    Jun. 17, 2021

(30) Foreign Application Priority Data
Feb. 6, 2019  (JP) .............................. JP2019-020036

(51) Int. Cl.
*A47G 23/08*  (2006.01)
*A47F 10/06*  (2006.01)
*B65G 47/50*  (2006.01)

(52) U.S. Cl.
CPC .............. *A47G 23/08* (2013.01); *A47F 10/06* (2013.01); *B65G 47/503* (2013.01); *B65G 2201/0202* (2013.01)

(58) Field of Classification Search
CPC ......... A47F 10/06; A47G 23/08; B65G 15/20; B65G 15/24; B65G 13/08; B65G 47/503
See application file for complete search history.

(56) References Cited

U.S. PATENT DOCUMENTS 3,578,148 A  *  5/1971  Pinckard ................. A47F 10/06
                                                           198/867.14
4,609,092 A  *  9/1986  Takai .................... B65G 47/766
                                                           186/42
(Continued)

FOREIGN PATENT DOCUMENTS

CN     207258731 U    4/2018
JP     2005/185326 A  7/2005
(Continued)

OTHER PUBLICATIONS

Search Report in International Application No. PCT/JP2019/024780 dated Aug. 27, 2019, 3 pages.
(Continued)

*Primary Examiner* — James R Bidwell
(74) *Attorney, Agent, or Firm* — Marshall, Gerstein & Borun LLP

(57) ABSTRACT

Disclosed is an ordered food and drink conveyance apparatus capable of reducing the number of man-hours required for conveying food and drink in a store as much as possible. A lifting device that raises food and drink placed on a belt conveyor and separates it from the belt conveyor is provided at an end point or in the middle of a conveyance path from a kitchen side to a customer seat floor side of a restaurant.

3 Claims, 13 Drawing Sheets

(56) References Cited

U.S. PATENT DOCUMENTS

| | | | |
|---|---|---|---|
| 2004/0206607 A1* | 10/2004 | Kawasaki | B65G 21/2063 198/831 |
| 2008/0128248 A1* | 6/2008 | Hoffjann | B64F 1/32 198/818 |
| 2010/0270123 A1* | 10/2010 | Ishino | A47F 10/06 198/465.1 |
| 2012/0186950 A1* | 7/2012 | Ishino | A47G 23/0208 198/850 |
| 2016/0286987 A1* | 10/2016 | Li | B65G 35/06 |
| 2017/0007055 A1 | 1/2017 | Ishino et al. | |
| 2017/0202385 A1 | 7/2017 | Ishino et al. | |
| 2018/0279817 A1 | 10/2018 | Ishino et al. | |

FOREIGN PATENT DOCUMENTS

| | | |
|---|---|---|
| JP | 2007/167475 A | 7/2007 |
| JP | 2010/012153 A | 1/2010 |
| JP | 2013-059387 A | 4/2013 |
| JP | 2016/152904 A | 8/2016 |
| JP | 2017/140297 A | 8/2017 |
| WO | WO-2018/037692 A1 | 3/2018 |

OTHER PUBLICATIONS

Office Action in TW Application No. 108136688 dated Jul. 14, 2020, 13 pages.
Office Action in SG Application No. 11201909628Y dated Aug. 24, 2020, 9 pages.

* cited by examiner

ORDERED FOOD AND DRINK CONVEYING APPARATUS

CROSS-REFERENCE TO RELATED APPLICATIONS

This application claims priority to Japanese Patent Application No. 2019-020036 filed on Feb. 6, 2019, the entire contents of which are incorporated by reference herein.

TECHNICAL FIELD

The present invention relates to an ordered food and drink conveyance apparatus.

BACKGROUND ART

In recent years, food and drink is served using a conveyance apparatus in a restaurant (see, for example, Patent Literatures 1 and 2).

DOCUMENTS OF PRIOR ARTS

Patent Document

[Patent document 1] Japanese Patent Application Laid-Open Publication No. 2005-185326
[Patent document 2] Japanese Patent Application Laid-Open Publication No. 2017-140297

SUMMARY OF THE INVENTION

Problems to be Solved by the Invention

When conveying the ordered food and drink, for example, it is conceivable to place the food and drink on a belt conveyor from the kitchen to the customer seat. In this case, customers sitting in the customer seat eat and drink at a table or a counter provided along the conveyance route of the belt conveyor. However, in a restaurant, in addition to a service to serve food and drink to customers who eat and drink in the store, a service to serve take-out food and drink to customers who want take out the food and drink may be performed. In this case, at the restaurant, the take-out food and drink prepared in the kitchen is delivered to the customer.

The kitchen of the restaurant is usually placed at a position distant from the vicinity of the entrance through which customers who come to eat and drink go in and out. In particular, in restaurants where food and drink is served using a conveyance apparatus, the floor area of the store is often relatively large, so that there is a high possibility that the kitchen is placed at a position far away from the entrance through which customers who come to eat and drink go in and out. Therefore, when the take-out food and drink is delivered at the vicinity of the store entrance to a customer who wants to take out the food and drink, a considerable number of man-hours to convey the take-out food and drink prepared in the kitchen to the vicinity of the store entrance is required, and the number of man-hours required for conveying the food and drink increases in proportion to the increase in the size of the store. However, in light of the recent shortage of human resources, it is difficult to secure human resources capable of corresponding with the increase in the number of man-hours.

This application discloses an ordered food and drink conveyance apparatus which can reduce the number of man-hours required for conveyance of the food and drink in a store as much as possible.

Means for Solving the Problems

In order to solve the above-mentioned problems, the present invention provides a lifting device that raises the food and drink placed on the belt conveyor and separates it from the belt conveyor at the end point or in the middle of the conveyance path from the kitchen side to the customer seat floor side of the restaurant.

Specifically, the present invention relates to an ordered food and drink conveyance apparatus including a belt conveyor that forms a conveyance path from a kitchen side to a customer seat floor side of a restaurant, where a plurality of customer seats is arranged along the conveyance path, a lifting device that is disposed at a predetermined location in an end point or a middle of the conveyance path and that raises food and drink placed on the belt conveyor to separate the food and drink from the belt conveyor, and a control unit that controls the belt conveyor and the lifting device, wherein when any of the plurality of customer seats is designated as a conveyance destination of the food and drink placed on the belt conveyor, the control unit stops the belt conveyor at a timing when the food and drink arrives at the any of the plurality of customer seats designated as the conveyance destination, and wherein when the predetermined location is designated as a conveyance destination of the food and drink placed on the belt conveyor, the control unit stops the belt conveyor at a timing when the food and drink arrives at the predetermined location designated as the conveyance destination and raises the food and drink by the lifting device.

In the above ordered food and drink conveyance apparatus, a lifting device is provided at the end point or in the middle of the conveyance path from the kitchen side to the customer seat floor side of the restaurant, so that the conveyed food and drink is raised by the lifting device and is away from the belt conveyor when the food and drink is conveyed to the lifting device. Therefore, even when the food and drink is in the lifting device, the ordered food and drink conveyance apparatus can carry the next food and drink. Also, for example, when the lifting device is located in the vicinity of the entrance of the restaurant, the take-out food and drink can be conveyed to the vicinity of the entrance of the restaurant by the ordered food and drink conveyance apparatus when the take-out food and drink is served to a customer who wants to take out the food and drink. Therefore, even in the case where the kitchen for preparing the take-out food and drink is distant from the entrance of the restaurant, the above ordered food and drink conveyance apparatus can reduce the number of man-hours required for conveying the take-out food and drink prepared in the kitchen to the vicinity of the entrance of the restaurant.

The belt conveyor is provided with an optical sensor that detects the presence or absence of food and drink on the belt conveyor with sensor light that is emitted in the longitudinal direction of the conveyance path, and the lifting device may raise the food and drink placed on the belt conveyor above the optical axis of the sensor light. In such an ordered food and drink conveyance apparatus, even when the food and drink is in the lifting device, it is possible to determine whether the food and drink is present on a belt conveyor.

Further, in a state where a first food and drink conveyed to the predetermined location is raised by the lifting device to be away from the belt conveyor, the control unit may operate the belt conveyor when a conveyance start operation in which a second food and drink different from the first food and drink is conveyed is performed, and may start conveying the second food and drink. In such an ordered food and drink conveyance apparatus, it is possible to convey the food and drink efficiently.

Moreover, the ordered food and drink conveyance apparatus may include a notification means disposed in the customer seat floor and making a notification that a food and drink arrives at the lifting device. When such a notification means is disposed in the customer seat floor such as the vicinity of the entrance through which customers come in and out, it is possible to easily grasp that the food and drink has arrived at the lifting device.

In addition, the belt conveyor may include a plurality of the belt conveyors in parallel, wherein the lifting device may push up a food and drink placed as to straddle the plurality of belt conveyors from below and may separate the food and drink from the plurality of belt conveyors, and wherein when in a case where the food and drink placed as to straddle the plurality of belt conveyors, the control unit makes accept an operation for designating the predetermined location as a conveyance destination and makes move the plurality of belt conveyors synchronous, and when in a case where the food and drink does not placed as to straddle the plurality of belt conveyors, the control unit makes reject an operation for designating the predetermined location as a conveyance destination and makes move the plurality of belt conveyors asynchronous. In such an ordered food and drink conveyance apparatus, it is possible to place the food and drink on a relatively large tray or the like and convey it to the lifting device.

Effects of the Invention

The above ordered food and drink conveyance apparatus can reduce the number of man-hours required for conveying the food and drink in a store as much as possible.

MODE FOR CARRYING OUT THE INVENTION

Hereinafter, embodiments of the present invention will be described. The embodiment described below is an aspect of the present invention, and does not limit the technical scope of the present invention. Embodiments and modifications shown below are suitable for restaurants which serve, for example, various kinds of foods and drinks such as sushi and beverages, a meal served in a bowl such as soba and Japanese noodles, and fried food and tempura to customers who take out the food and drink in addition to customers who eat and drink in the shop.

Figure 1:
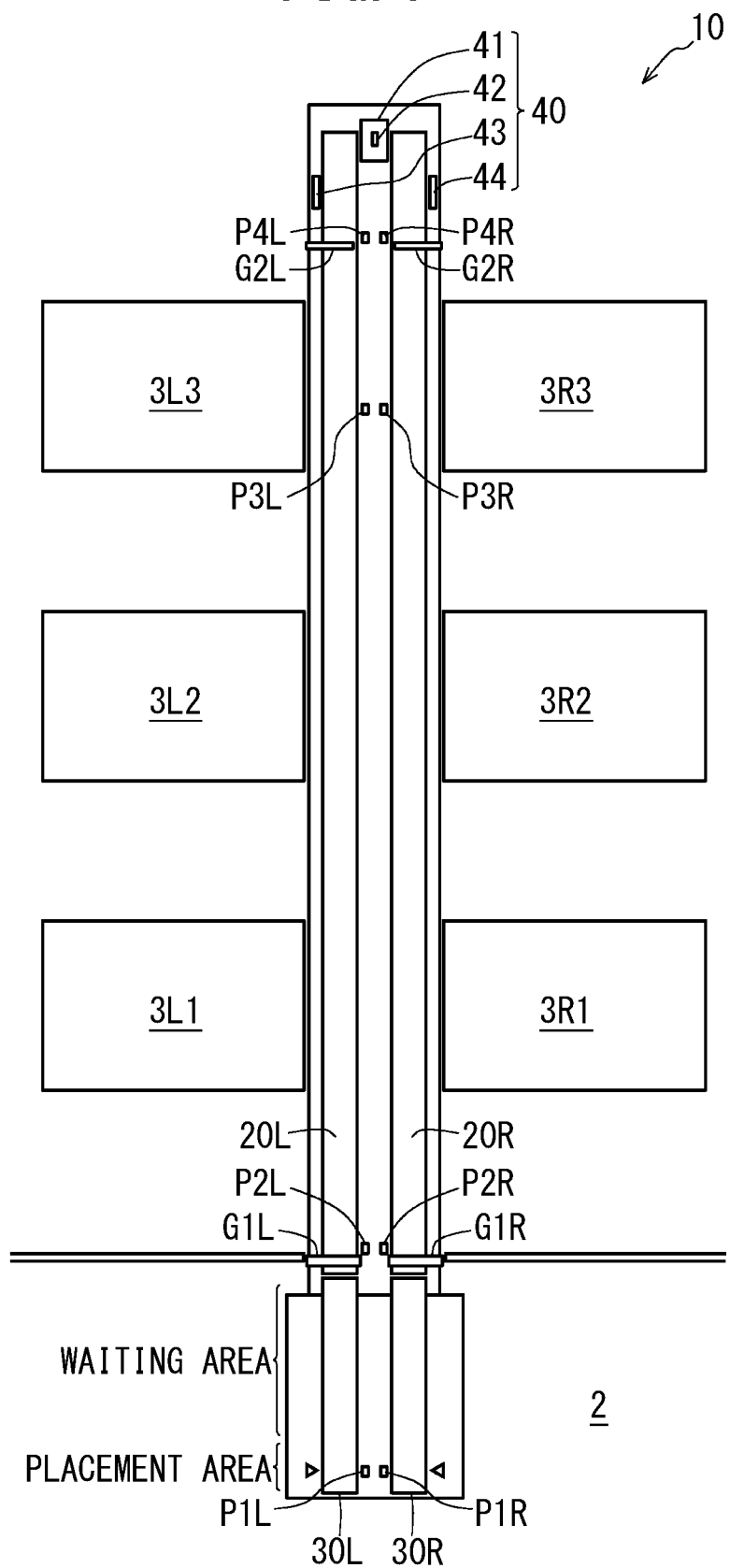
FIG. 1 is an entire block diagram of an ordered food and drink conveyance apparatus according to an embodiment.

FIG. 1 is an entire block diagram of an ordered food and drink conveyance apparatus 10 according to the embodiment. The ordered food and drink conveyance apparatus 10 conveys the food and drink prepared in response to the customer order from a restaurant kitchen 2 to customer seats 3L1 to 3L3, and 3R1 to 3R3 (hereinafter referred to as customer seats 3 in the case of unspecified customer seats), and as shown in FIG. 1, forms a conveyance path that passes by the side of the respective customer seats 3 where customers eat and drink. The ordered food and drink conveyance apparatus 10 includes main belt conveyors 20L and 20R (hereinafter referred to as a main belt conveyor 20 in the case of an unspecified main belt conveyor) that forms a conveyance path from the kitchen 2 side of the restaurant to the customer seat area, and sub belt conveyors 30L and 30R (hereinafter referred to a sub belt conveyor 30 in the case of an unspecified sub belt conveyor) that is extended in the kitchen 2 side from the main belt conveyors 20L and 20R, and that extends the conveyance path. The ordered food and drink conveyance apparatus 10 conveys the food and drink on various tableware such as plates, conveys, for example, film packages, which contain the food and drink, directly placed on a belt conveyor without using tableware, or conveys the food and drink on a tray.

The sub belt conveyor 30 has a length such that four plates for food and drink can be placed side by side along the longitudinal direction. Further, on the side of the sub belt conveyor 30, a mark indicating a position (placement area) where the plate is to be placed is attached. Of the conveyance faces of the sub belt conveyor 30, the vicinity of the end portion of the sub belt conveyor 30 on the front side (kitchen 2 side) serves as a placement area for staff members to place the food and drink and the portion behind the placement area (customer seats 3 side) serves as a waiting area where the food and drink is kept waiting. Further, an operation panel for receiving various operations is provided near the sub belt conveyor 30.

Figure 2:
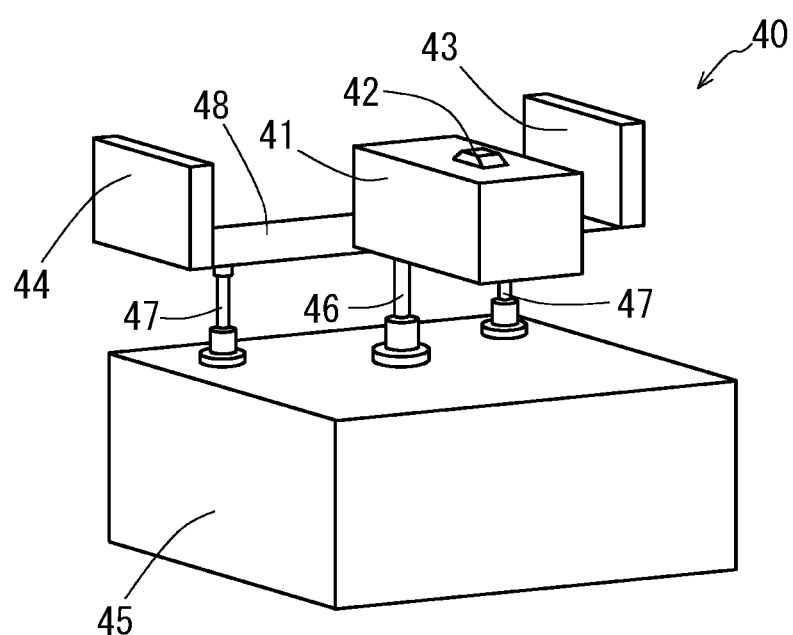
FIG. 2 is a diagram showing an example of a lifting device.

Further, the ordered food and drink conveyance apparatus 10 includes a lifting device 40 which is provided at an end portion of the main belt conveyor 20 on the customer seat floor side and that lifts the food and drink conveyed by the main belt conveyor 20 to separate the food and drink from the main belt conveyor 20. FIG. 2 is a diagram showing an example of the lifting device 40. The lifting device 40 is a device for pushing up a member from the lower side of a food and drink tray to raise and lower the tray, and includes a push-up member 41 which is lifted and lowered between the main belt conveyor 20L and the main belt conveyor 20R to push up the tray. A contact sensor 42 that detects the contact of the tray is provided on the upper face of the push-up member 41. Further, in order to stabilize the posture of the tray pushed up by the push-up member 41, support members 43 and 44 which are raised and lowered on both sides of the main belt conveyors 20L and 20R to support the tray are provided. The push-up member 41 and the support members 43 and 44 are fixed to a lifting plate 48 and integrally move up and down. The lifting plate 48 is fixed to the upper end of a lifting bar 46 pushing upward from a lifting drive unit 45 incorporating a lift motor and a crank mechanism, and moves according to the vertical movement of the lifting bar 46. Further, in order to stabilize the posture of the lifting plate 48, two support bars 47 are provided on both sides of the lifting bar 46. The lifting bar 46 and the support bars 47 both linearly move in the vertical direction by the linear guide.

Figure 3:
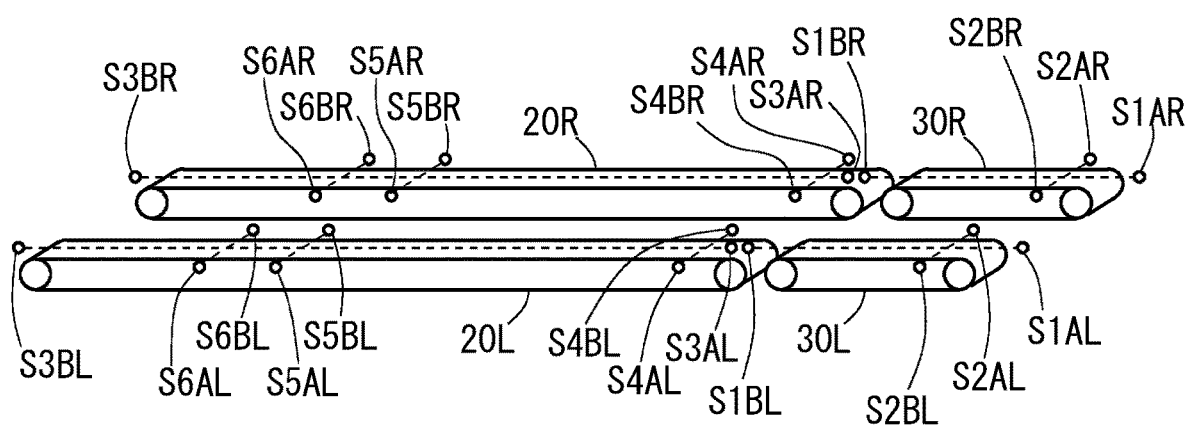
FIG. 3 is a diagram showing an example of a mounting location of an optical sensor provided in the ordered food and drink conveyance apparatus.

FIG. 3 is a diagram showing an example of a mounting location of an optical sensor provided in the ordered food and drink conveyance apparatus 10. As shown in FIG. 3, the ordered food and drink conveyance apparatus 10 includes an optical sensor at each part. For example, a sensor S1AL emits sensor light toward the longitudinal direction of the conveyance path formed by the sub belt conveyor 30L, and a sensor S1BL receives the sensor light, so that a sensor S1L detects the presence or absence of the food and drink on the sub belt conveyor 30L (placement area and waiting area). In addition, one of a sensor S2AL and a sensor S2BL emits sensor light in a direction which crosses the conveyance path of the sub belt conveyor 30L in the placement area, and the other of the sensors receives the sensor light, so that a sensor S2L detects the presence or absence of the food and drink in the placement area of the sub belt conveyor 30L. A sensor S3BL emits sensor light toward the longitudinal direction of the conveyance path formed by the main belt conveyor 20L, and a sensor S3AL receives the sensor light, so that a sensor S3L detects the presence or absence of the food and drink on the main belt conveyor 20L. In addition, one of a sensor S4AL and a sensor S4BL emits sensor light in a direction which crosses the conveyance path of the main belt conveyor 20L, and the other of the sensors receives the sensor light, so that a sensor S4L detects the presence or absence of the food and drink passing between the sensor S4AL and the sensor S4BL. The same applies to a sensor S5L and a sensor S6L as in the sensor S4L. The main belt conveyor 20R and the sub belt conveyor 30R also include sensors same as those provided on the main belt conveyor 20L and the sub belt conveyor 30L.

The sensor S2AL is provided on a movable member P1L that is lowered when a contact object such as a tray is touched. Further, a sensor S2BR is provided on a movable member P1R which is lowered when a contact object such as a tray is touched. Similarly, the sensor S4BL is provided on a movable member P2L, a sensor S4BR is provided on a movable member P2R, a sensor S5BL is provided on a movable member P3L, a sensor SSBR is provided on a movable member P3R, a sensor S6BL is provided on a movable member P4L, and a sensor S6BR is provided on a movable member P4R.

The sensor S1BL and the sensor S3AL are provided in a gate G1L that is automatically opened and closed by a motor. A sensor S51BR and a sensor S3AR are provided in a gate G1R that is automatically opened and closed by a motor.

Therefore, the sensors provided in the ordered food and drink conveyance apparatus 10 do not interfere with the route of the plates and trays for food and drink conveyed to the ordered food and drink conveyance apparatus 10. The main belt conveyor 20L is provided with a gate G2L that is automatically opened and closed by a motor in the vicinity of the lifting device 40, and the main belt conveyor 20R is provided with a gate G2R that is automatically opened and closed by a motor in the vicinity of the lifting device 40. Sensor light from the sensor S3L passes under the gate G2L, and sensor light from a sensor S3R passes under the gate G2R, so that the gates G2L and G2R do not interfere with the sensor light.

In addition, below the ordered food and drink conveyance apparatus 10, a food and drink circulation conveyance apparatus in which the food and drink is circularly conveyed and another ordered food and drink conveyance apparatus may be provided. Further, above the ordered food and drink conveyance apparatus 10, a shelf board on which a teacup, seasoning, menu, and the like are placed may be supported by posts or the like.

The main belt conveyor 20, the sub belt conveyor 30, and the lifting device 40 are controlled by a control device. The control device outputs a control signal based on the operation content input to the operation panel disposed near the sub belt conveyor 30 and the signal from each sensor. Hereinafter, the operation of the ordered food and drink conveyance apparatus 10 implemented by the control device will be described.

<Pitch Feeding Operation>

Figure 4:
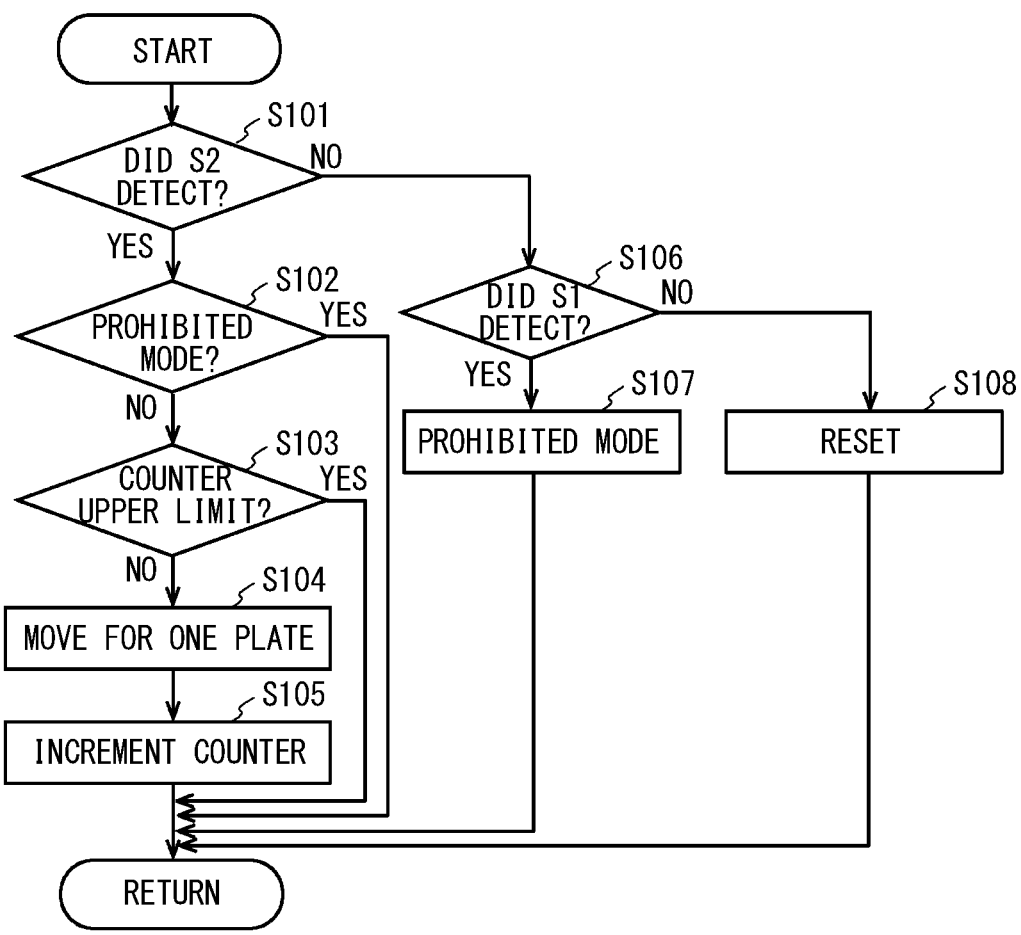
FIG. 4 is a diagram showing an example of a process flow of the pitch feeding operation implemented by a control device of the ordered food and drink conveyance apparatus.

In the ordered food and drink conveyance apparatus 10, when the food and drink is placed on the placement area of the sub belt conveyor 30, the sub belt conveyor 30 performs a pitch feeding operation to move the food and drink placed on the placement area to the waiting area. FIG. 4 is a diagram showing an example of a process flow of the pitch feeding operation implemented by a control device of the ordered food and drink conveyance apparatus 10.

The control device of the ordered food and drink conveyance apparatus 10 determines whether the sensor S2L has detected the food and drink (S101). When the food and drink is placed on the placement area of the sub belt conveyor 30L, the control device of the ordered food and drink conveyance apparatus 10 makes an affirmative determination in step S101. When the control device of the ordered food and drink conveyance apparatus 10 makes an affirmative determination in step S101, then it refers to the memory in the control device, and determines whether the pitch feeding prohibition mode for prohibiting pitch feeding is performed (S102). When the control device of the ordered food and drink conveyance apparatus 10 makes a negative determination in step S102, then it refers to the memory in the control device, and determines whether the counter for counting the number of foods and drinks in the waiting area is the upper limit value (S103). In the present embodiment, since the number of plates for food and drink that can be placed in the waiting area is three, the upper limit value of the counter is set to "3". When the control device of the ordered food and drink conveyance apparatus 10 makes a negative determination in step S103, it operates the sub belt conveyor 30L by a predetermined amount (for one plate for food and drink) (S104). Then, the control device of the ordered food and drink conveyance apparatus 10 accesses the memory in the control device, and increments the counter value by one (S105).

Moreover, the control device of the ordered food and drink conveyance apparatus 10 determines whether sensor S1L has detected the food and drink after it makes a negative determination step S101 (S106). Then, when the control device of the ordered food and drink conveyance apparatus 10 makes an affirmative determination in step S106, it accesses the memory in the control device and sets a flag of the pitch feeding prohibition mode in the memory. For example, when the food and drink is mistakenly placed directly in the waiting area instead of the placement area of the sub belt conveyor 30L, a negative determination is made in step S101 and an affirmative determination is made in step S106, so that the sub belt conveyor 30L is in a pitch feeding prohibition mode. As a result, since the negative determination is not made in step S102, the sub belt conveyor 30L does not perform the pitch feeding operation in a situation where there is food and drink on it which has been erroneously placed in the waiting area and regarding which the state in which it has been placed in the waiting area is unknown.

When the control device of the ordered food and drink conveyance apparatus 10 makes a negative determination in step S106, it accesses the memory in the control device and resets the flag of the pitch feeding prohibition mode and the counter value (S108). Therefore, for example, even when the food and drink is erroneously placed directly in the waiting area instead of the placement area of the sub belt conveyor 30L, the flag of the pitch feeding prohibition mode and counter value are reset when all foods and drinks are removed from the sub belt conveyor 30L, and the pitch feeding operation and the like of the step 104 can be performed again. Further, the flag of the pitch feeding prohibition mode and the counter value are reset even when the food and drink on the sub belt conveyor 30L is conveyed to the customer seats 3 by performing the conveyance start operation described later.

In addition, although a series of processes from step S101 to step S108 mentioned above are illustrated about the case of the sub belt conveyor 30L, the same applies to the sub belt conveyor 30R.

Figure 5:
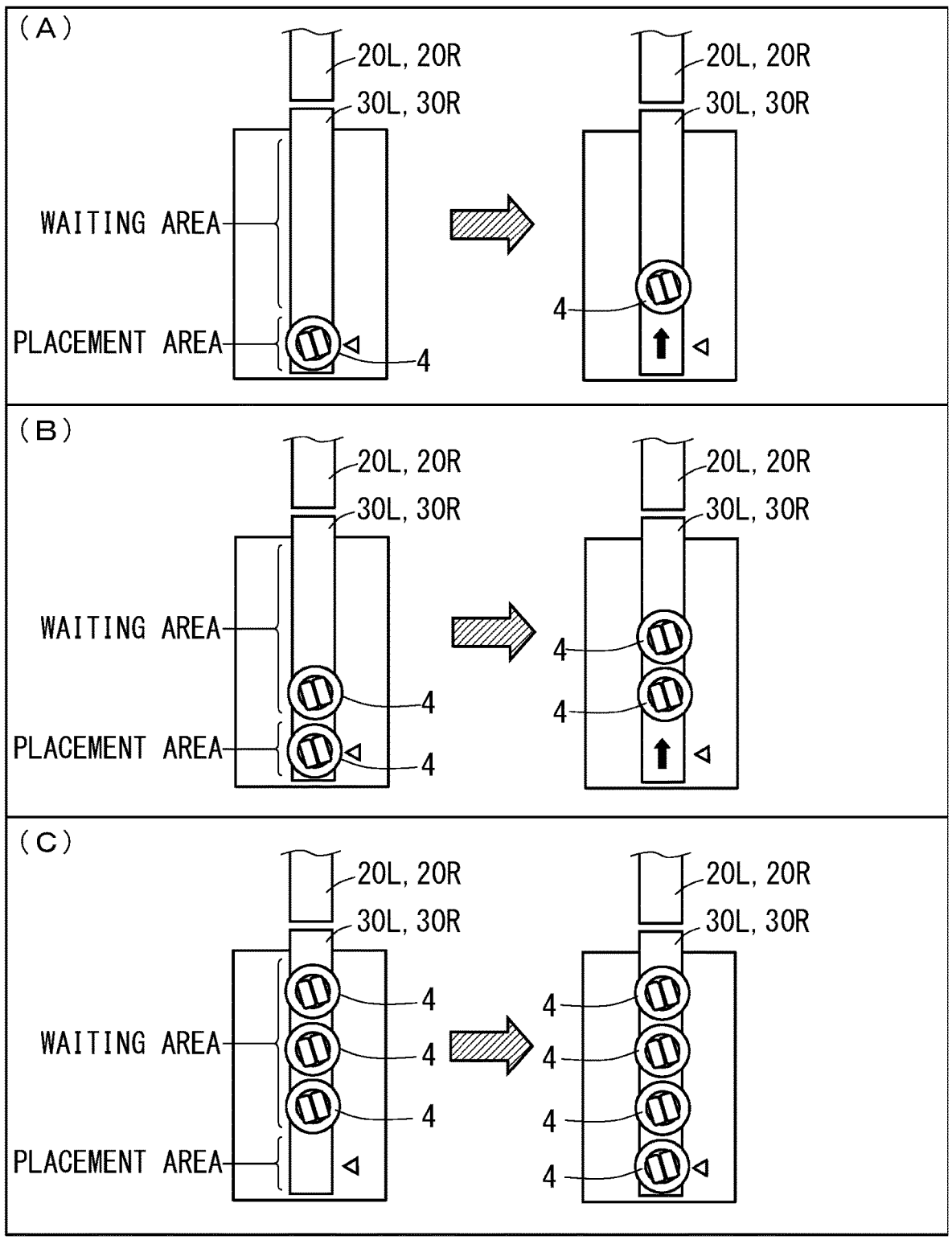
FIG. 5 is a diagram showing a state of pitch feeding.

FIG. 5 is a view showing the state of pitch feeding. For example, in the state where there is not a single plate for food and drink on the sub belt conveyor 30, when a plate 4 for food and drink is placed on the placement area, the control device of the ordered food and drink conveyance apparatus 10 makes an affirmative determination in step S101, and performs step S104 by making a negative determination in step S102 and step S103. Then, the plate 4 placed on the placement area moves to the waiting area as shown in FIG. 5(A). Then, when a second plate 4 is placed on the placement area, a series of processes from step S101 to step S104 is performed to make the second plate 4 placed on the placement area move to the waiting area as shown in FIG. 5(B).

When the number of the plates 4 in the waiting area reaches three by repetition of such processing, the counter of the memory of the control device of the ordered food and drink conveyance apparatus 10 reaches an upper limit value. Therefore, when a fourth plate 4 is placed on the placement area in this state, an affirmative determination is made in the process of step S103, and the process of step S104 is not performed. Therefore, as shown in FIG. 5(C), the fourth plate 4 placed on the placement area is kept in the state of being placed on the placement area.

The description of the pitch feeding operation implemented in the sub belt conveyor 30 is as described above. In the ordered food and drink conveyance apparatus 10 of this embodiment, it is possible to grasp the state of the plate 4 placed on the sub belt conveyor 30L with the two sensor light beams of the sensor S1L and the sensor S2L to implement the above pitch feeding operation, so that it is not necessary to use a high-grade sensor such as an area sensor in order to grasp the state of the plate 4 placed on the sub belt conveyor 30L. Therefore, the pitch feeding in the sub belt conveyor 30L can be implemented by a relatively simple sensor configuration of the sensor S1L and the sensor S2L. The same applies to the sub belt conveyor 30R side as with the sub belt conveyor 30L.

Next, processing when a conveyance start operation is performed will be described.

<Conveyance Operation>

Figure 6:
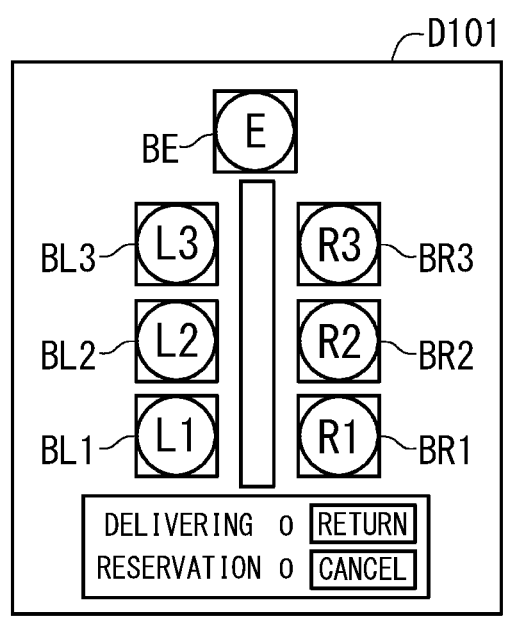
FIG. 6 is a diagram showing an example of a screen of an operation panel.

When the conveyance start operation is performed on the operation panel provided in the vicinity of the sub belt conveyor 30, the control device of the ordered food and drink conveyance apparatus 10 operates the sub belt conveyor 30 and the main belt conveyor 20, and conveys the food and drink from the kitchen 2 to a customer seat 3 or the lifting device 40. FIG. 6 is a diagram showing an example of the screen of the operation panel.

When buttons BL1 to BL3, BR1 to BR3 and BE indicating the conveyance destination are pressed on a screen D101 of the operation panel, the control device of the ordered food and drink conveyance apparatus 10 outputs a control signal to operate the sub belt conveyor 30 and the main belt conveyor 20, and conveys a plate 4 for food and drink placed on the sub belt conveyor 30 to a location corresponding to any of the buttons BL1 to BL3, BR1 to BR3, and BE, that is, to the customer seats 3 or the lifting device 40. The button BL1 corresponds to a customer seat 3L1, the button BL2 corresponds to a customer seat 3L2, the button BL3 corresponds to a customer seat 3L3, the button BR1 corresponds to a customer seat 3R1, the button BR2 corresponds to a customer seat 3R2, the button BR3 corresponds to a customer seat 3R3, and the button BE corresponds to the lifting device 40.

Figure 7:
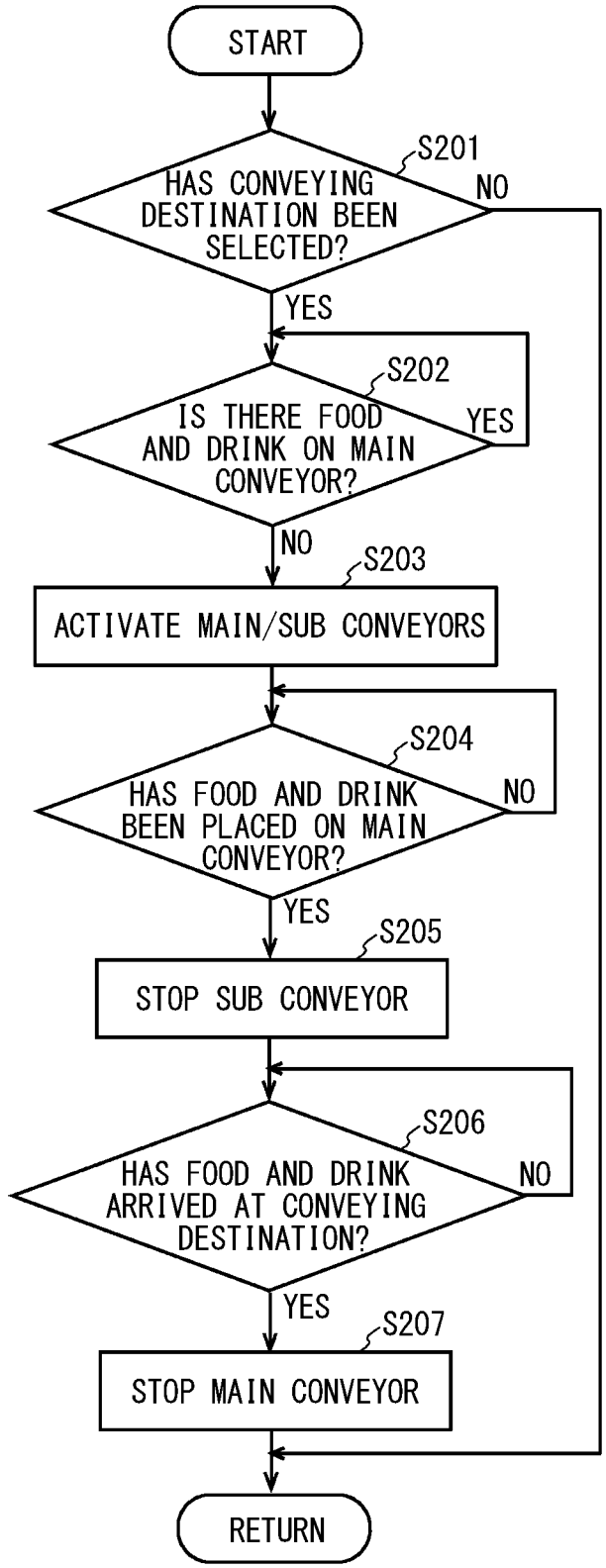
FIG. 7 shows a control flow performed when a conveyance start operation is performed.

FIG. 7 shows a control flow performed when the conveyance start operation is performed. The control device of the ordered food and drink conveyance apparatus 10 determines whether the buttons BL1 to BL3, BR1 to BR3 and BE have been pressed on the operation panel (S201). Then, when it is detected that the selection operation of the customer seat is performed in the process of step S201, the control device determines whether the food and drink is placed on the main belt conveyor 20 (S202). When the buttons BL1 to BL3 are pressed, the control device determines, in step S202, with the sensor S3L whether the food and drink is placed on the main belt conveyor 20L. When the buttons BR1 to BR3 are pressed, the control device determines, in step S202, with the sensor S3R whether the food and drink is placed on the main belt conveyor 20R. When the button BE is pressed, the control device determines, in step S202, with the sensor S3L and the sensor S3R whether the food and drink is placed on both the main belt conveyor 20L and the main belt conveyor 20R.

Then, when the control device makes a negative determination in the process of step S202, it activates the main belt conveyor 20 and the sub belt conveyor 30 (S203). For example, when the buttons BL1 to BL3 are pressed, the sub belt conveyor 30L and the main belt conveyor 20L are activated, when the buttons BR1 to BR3 are pressed, the sub belt conveyor 30R and the main belt conveyor 20R are activated, and when the button BE is pressed, the sub belt conveyors 30L and 30R and the main belt conveyors 20L and 20R are activated.

After performing the process of step S203, the control device determines whether all foods and drinks placed on the sub belt conveyor 30 have arrived on the main belt conveyor 20 (S204). For example, when the main belt conveyor 20L and the sub belt conveyor 30L are in operation, it is determined by the sensor S4L whether all foods and drinks placed on the sub belt conveyor 30L are on the main belt conveyor 20L. Also, for example, when the main belt conveyor 20R and the sub belt conveyor 30R are in operation, it is determined by a sensor S4R whether all foods and drinks placed on the sub belt conveyor 30R are on the main belt conveyor 20R. The control device may determine whether all foods and drinks placed on the sub belt conveyor 30 are placed on the main belt conveyor 20 based on the amount of movement after the sub belt conveyor 30 is activated instead of the sensor. When the control device makes an affirmative determination in the process of step S204, it stops the sub belt conveyor 30 (S205).

After performing the process of step S205, the control device determines whether the food and drink has arrived at the selected conveyance destination (S206). The control device may determine whether the food and drink has arrived at the conveyance destination based on, for example, a detection result of a sensor disposed near the conveyance destination, or based on the elapsed time from the start of conveyance set in advance for each conveyance destination, the number of steps of the motor of the belt conveyor, or the like. When the control device makes an affirmative determination in the process of step S206, it stops the main belt conveyor 20 (S207). For example, when the main belt conveyor 20L is in operation, the main belt conveyor 20L is stopped. Further, for example, when the main belt conveyor 20R is in operation, the main belt conveyor 20R is stopped. Further, for example, when the main belt conveyors 20L and 20R are in operation, the main belt conveyors 20L and 20R are stopped.

Figure 8:
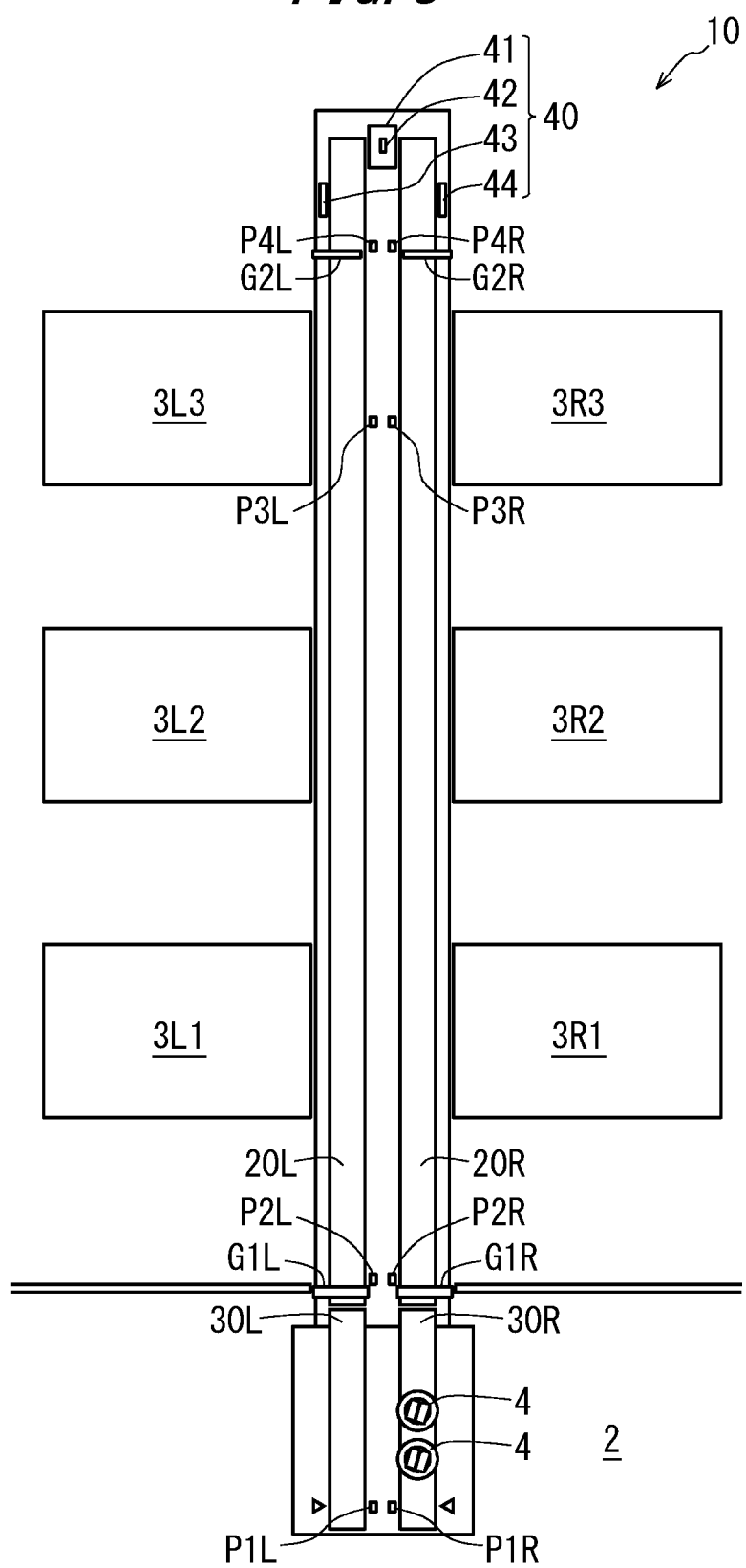
FIG. 8 is a first diagram showing a state at the time of conveyance.
Figure 9:
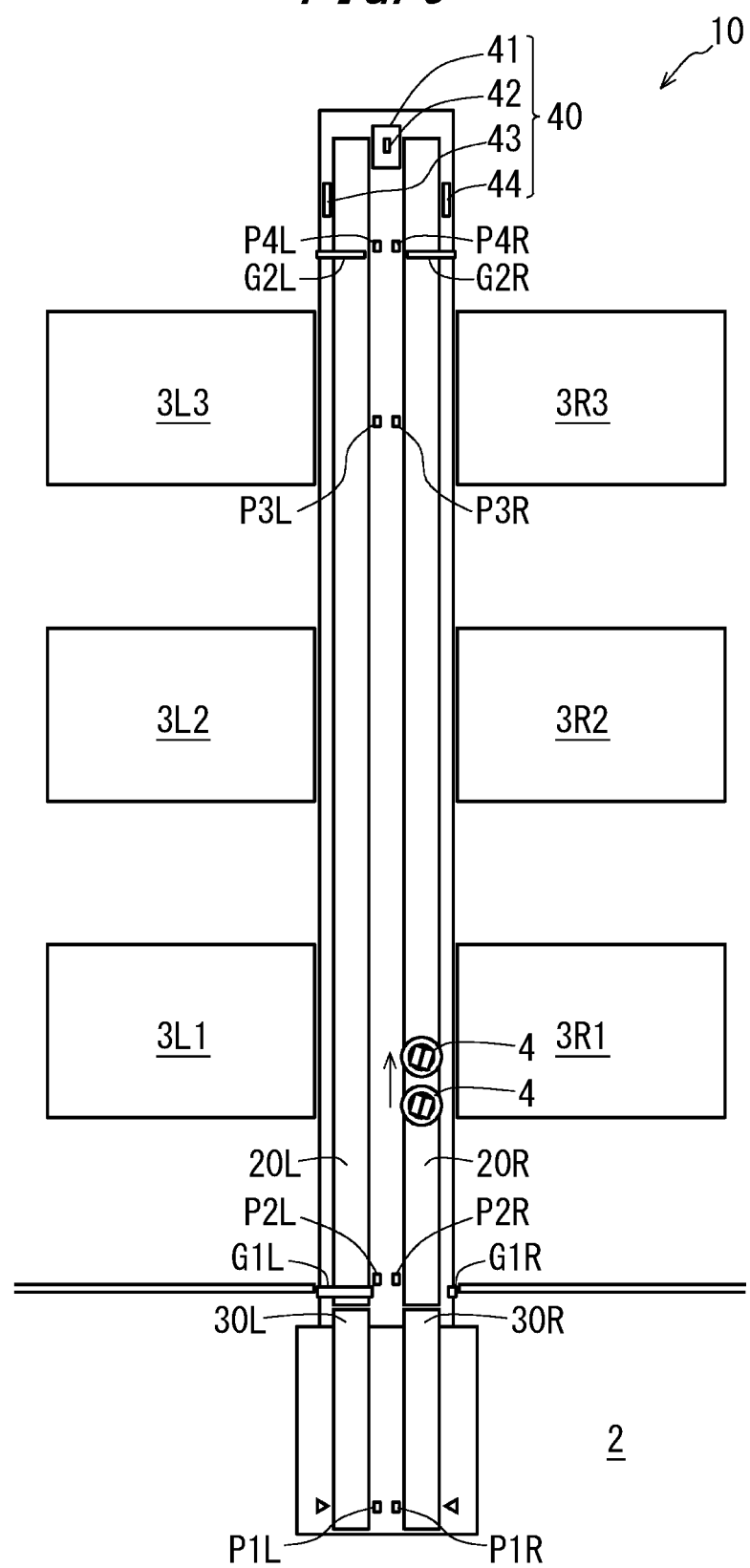
FIG. 9 is a second diagram showing a state at the time of conveyance.

FIG. 8 is a first diagram showing a state at the time of conveyance. FIG. 9 is a second diagram showing a state at the time of conveyance. For example, as shown in FIG. 8, when any of the buttons BR1 to BR3 is pressed with two plates 4 placed on the sub belt conveyor 30R, as shown in FIG. 9, the gate G1R opens and the sub belt conveyor 30R and the main belt conveyor 20R are activated, and the plates 4 move to the designated conveyance destination. When all the plates 4 placed on the sub belt conveyor 30R are placed on the main belt conveyor 20R, since the sub belt conveyor 30R will be in a stopped state, the staff members in the kitchen 2 can place on the sub belt conveyor 30R the food and drink to be conveyed next. In addition, when the plate 4 arrives at the designated conveyance destination, the main belt conveyor 20R is stopped.

Figure 10:
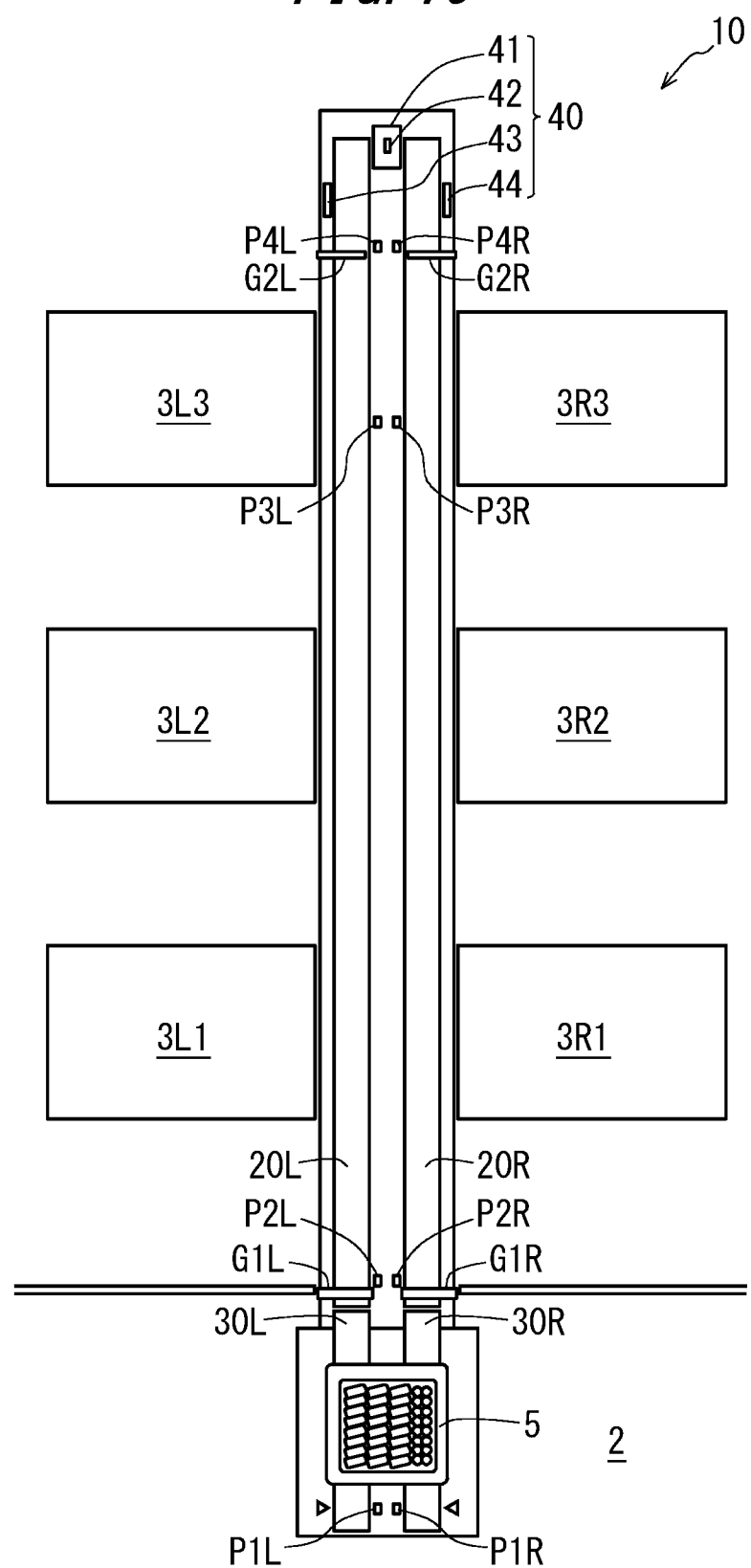
FIG. 10 is a third diagram showing a state at the time of conveyance.
Figure 11:
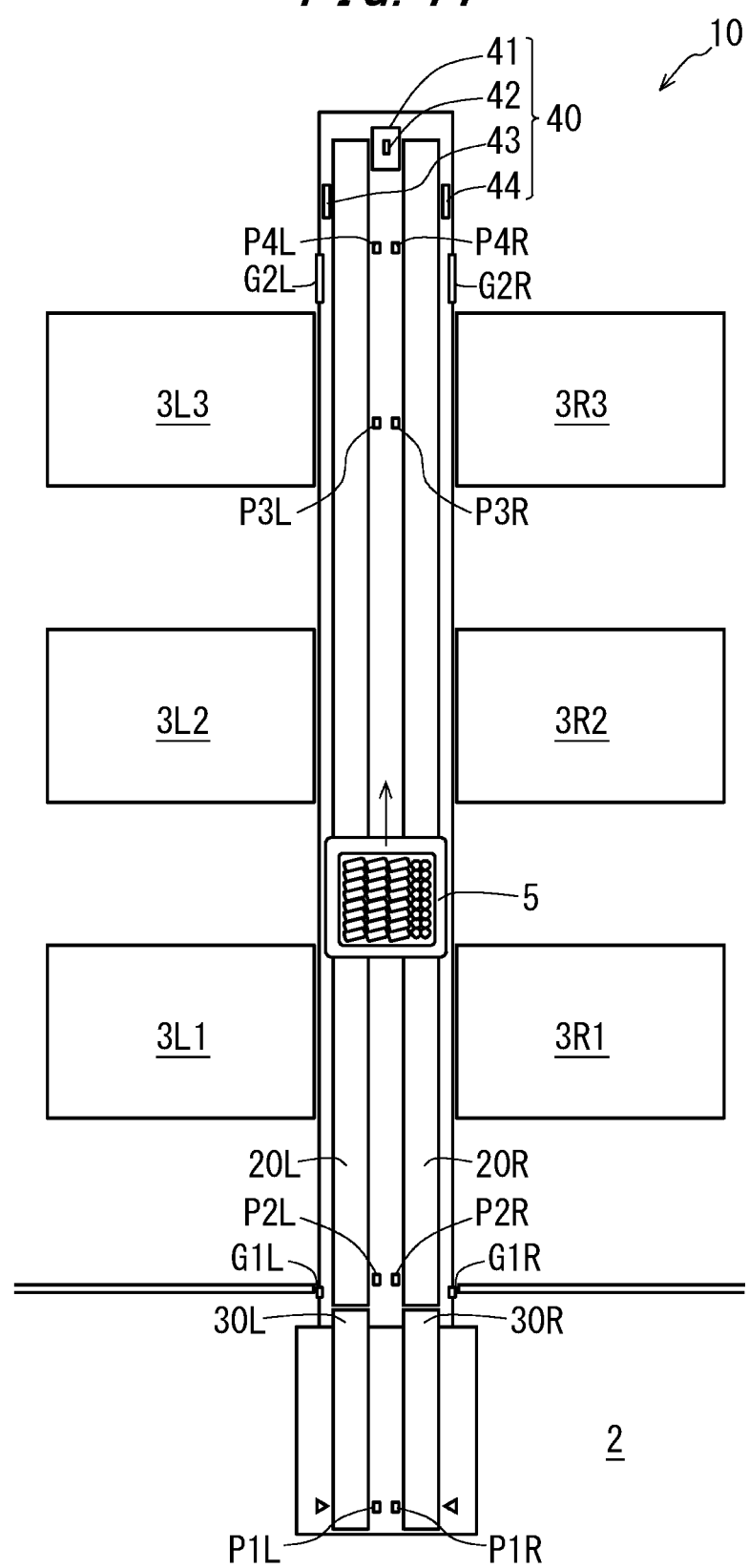
FIG. 11 is a fourth diagram showing a state at the time of conveyance.
Figure 12:
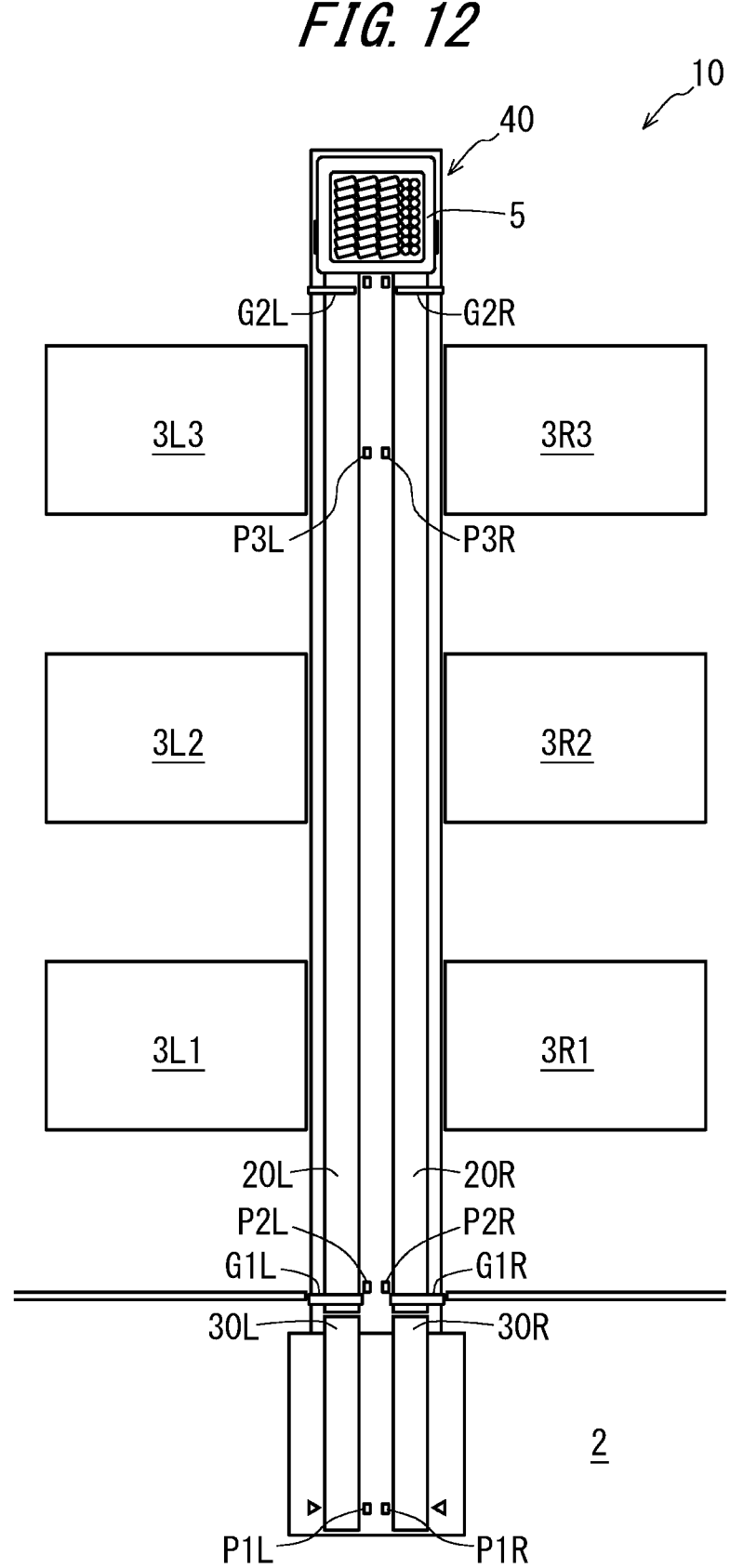
FIG. 12 is a fifth diagram showing a state at the time of conveyance.

FIG. 10 is a third diagram showing a state at the time of conveyance. FIG. 11 is a fourth diagram showing a state at the time of conveyance. FIG. 12 is a fifth diagram showing a state at the time of conveyance. For example, as shown in FIG. 10, when the button BE is pressed in a state where a tray 5 on which the take-out food and drink is placed is placed as to straddle both the sub belt conveyor 30L and the sub belt conveyor 30R, the gates G1L and G1R are opened and the sub belt conveyors 30L and 30R and the main belt conveyors 20L and 20R are activated, and the tray 5 moves to the lifting device 40 that is the designated conveyance destination, as shown in FIG. 11. When the tray 5 contacts the members P3L and P3R, the gates G2L and G2R open. When the tray 5 placed on the sub belt conveyors 30L and 30R is placed on the main belt conveyors 20L and 20R, the sub belt conveyors 30L and 30R are in a stopped state, so that the staff members in the kitchen 2 can place on the sub belt conveyors 30L and 30R the food and drink to be conveyed next. Further, as shown in FIG. 12, when the tray 5 arrives at the lifting device 40, the main belt conveyors 20L and 20R are stopped.

Figure 13:
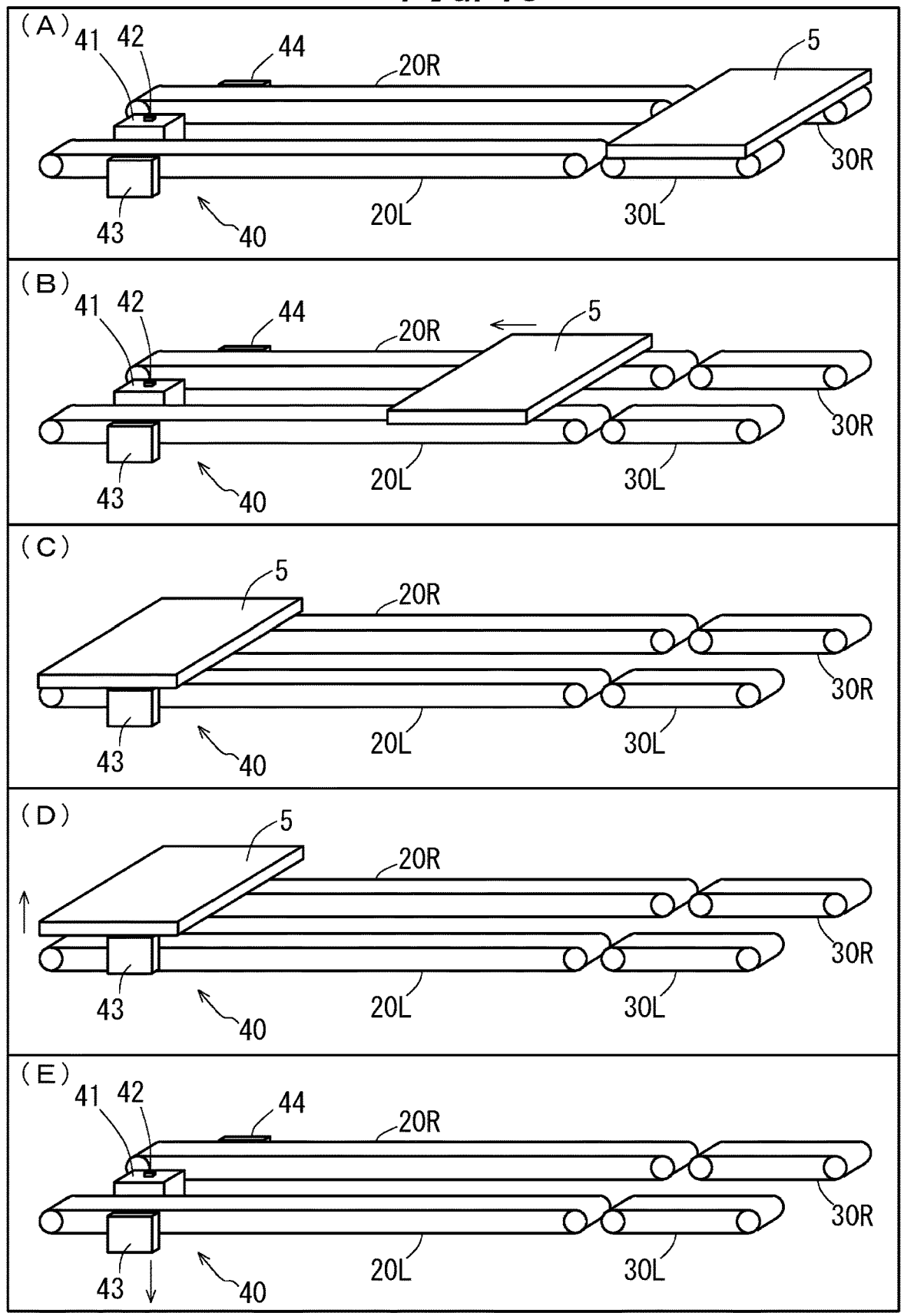
FIG. 13 is a diagram showing the lifting and lowering operation of the lifting device.

FIG. 13 is a view showing the lifting and lowering operation of the lifting device 40. As shown in FIG. 13(A), when the button BE is pressed in a state where the tray 5 on which the take-out food and drink is placed is placed as to straddle both the sub belt conveyor 30L and the sub belt conveyor 30R, the sub belt conveyors 30L and 30R and the main belt conveyors 20L and 20R are activated, and the tray 5 moves to the lifting device 40, as shown in FIG. 13(B). Then, as shown in FIG. 13(C), when the tray 5 arrives at the lifting device 40, the lifting device 40 starts the lifting operation. Then, as shown in FIG. 13(D), when the tray 5 reaches the upper limit position of the lifting device 40, the lifting device 40 is stopped. Then, as shown in FIG. 13(E), when the contact sensor 42 detects that the tray 5 has been removed from the lifting device 40, the lifting device 40 starts the lowering operation and stops at the lower limit position.

The main operations implemented by the control device of the ordered food and drink conveyance apparatus 10 are as described above. In the case of the above-mentioned ordered food and drink conveyance apparatus 10, not only the customer seats 3 provided along the main belt conveyor 20 but also the lifting device 40 at the end point of the main belt conveyor 20 (which is an example of a "predetermined location" in the present application) can be designated as the conveyance destination of the food and drink. Therefore, for example, when the lifting device 40 is near the entrance of the restaurant, the take-out food and drink can be conveyed to the vicinity of the entrance of the restaurant by the ordered food and drink conveyance apparatus 10 when the take-out food and drink is served to a customer who wants to take out the food and drink. Therefore, even in the case where the kitchen 2 for preparing the take-out food and drink is distant from the entrance of the restaurant, the ordered food and drink conveyance apparatus 10 of the above embodiment can reduce the number of man-hours for conveying the take-out food and drink prepared in the kitchen 2 to the vicinity of the entrance of the restaurant. Such an effect is remarkable in proportion to the increase in the size of the store.

Moreover, in the ordered food and drink conveyance apparatus 10 of the said embodiment, when the tray 5 is conveyed to the lifting device 40, the lifting device 40 will perform the lifting operation. When the lifting device 40 performs the lifting operation, the push-up member 41 and the contact sensors 42 and 43 contact the lower surface of the tray 5 to push the tray 5 up, and the tray 5 moves away from the main belt conveyors 20L and 20R. Therefore, even when the tray 5 is on the lifting device 40, the main belt conveyors 20L and 20R can be operated again to convey other food and drink. Further, since the tray 5 is away from the main belt conveyors 20L and 20R, the sensor light of the sensors S3L and S3R is not blocked by the tray 5 on the lifting device 40. Therefore, even when the tray 5 is on the lifting device 40, the control device of the ordered food and drink conveyance apparatus 10 can detect the presence or absence of the food and drink on the main belt conveyors 20L and 20R by the sensors S3L and S3R. Therefore, in the ordered food and drink conveyance apparatus 10, even when the tray 5 is on the lifting device 40, the food and drink can be conveyed to any of the customer seats 3.

In addition, when the plate 1 for food and drink arrives at the conveyance destination, the control device of the ordered food and drink conveyance apparatus 10 may cause a terminal near the conveyance destination to notify people around the destination of the arrival of the food and drink. In this case, when the conveyance destination is the customer seats 3, the order terminal of the customer seats 3 makes a notification of the arrival of the food and drink, and when the conveyance destination is the lifting device 40, the order terminal in the vicinity of a checkout machine provided in the vicinity of the entrance through which customers who come to eat and drink go in and out or the checkout machine will make a notification of the arrival of the food and drink.

Moreover, the ordered food and drink conveyance apparatus 10 may not have two types of belt conveyors, the main belt conveyor 20 and the sub belt conveyor 30, but may have two belt conveyors each of which is parallel from the kitchen 2 to the customer seats 3.

In addition, in the ordered food and drink conveyance apparatus 10, the present invention is not limited to the embodiment in which two conveyance paths are provided in parallel from the kitchen 2 to the customer seats 3 to allow both the plate 4 and the tray 5 to be conveyed. For example, one conveyance path may be formed by a wide belt having a width that allows the tray 5 to be placed. Further, when the food and drink to be conveyed to the lifting device 40 has a size about the same as that of the plate 4, the ordered food and drink conveyance apparatus 10 may have one conveyance path formed by, for example, a belt having a width enough to place the plate 4 thereon.

Moreover, the ordered food and drink conveyance apparatus 10 may have the lifting device 40 not at the end point of the main belt conveyor 20 but at the middle point. For example, when the entrance of the restaurant is near the middle point of the conveyance path of the main belt conveyor 20, it is convenient for the conveyance of the tray 5 for take-out food and drink when the lifting device 40 is at the middle point.

DESCRIPTION OF THE REFERENCE NUMERALS AND SYMBOLS

2 kitchen
3 customer seat
4 plate
5 tray
10 ordered food and drink conveyance apparatus
20 main belt conveyor
30 sub belt conveyor
40 lifting device

The invention claimed is:

1. An ordered food and drink conveyance apparatus comprising,
   a belt conveyor that forms a conveyance path from a restaurant kitchen side to a customer seat floor side, a plurality of customer seats being arranged along the conveyance path;
   a lifting device that is disposed at a predetermined location in an end point or a middle of the conveyance path and that raises food and drink placed on the belt conveyor to separate the food and drink from the belt conveyor; and
   a control unit that controls the belt conveyor and the lifting device,
   wherein when any of the plurality of customer seats is designated as a conveyance destination of the food and drink placed on the belt conveyor, the control unit stops the belt conveyor at a timing when the food and drink arrives at the any of the plurality of customer seats designated as the conveyance destination,
   wherein when the predetermined location is designated as a conveyance destination of the food and drink placed on the belt conveyor, the control unit stops the belt conveyor at a timing when the food and drink arrives at the predetermined location designated as the conveyance destination and raises the food and drink by the lifting device, and
   wherein the belt conveyor is provided with an optical sensor that detects a presence or absence of a food and drink on the belt conveyor with sensor light that is emitted in a longitudinal direction of the conveyance path, and wherein the lifting device raises the food and drink placed on the belt conveyor above an optical axis of the sensor light.

2. An ordered food and drink conveyance apparatus comprising,
   a belt conveyor that forms a conveyance path from a restaurant kitchen side to a customer seat floor side, a plurality of customer seats being arranged along the conveyance path;
   a lifting device that is disposed at a predetermined location in an end point or a middle of the conveyance path and that raises food and drink placed on the belt conveyor to separate the food and drink from the belt conveyor; and
   a control unit that controls the belt conveyor and the lifting device,
   wherein when any of the plurality of customer seats is designated as a conveyance destination of the food and drink placed on the belt conveyor, the control unit stops the belt conveyor at a timing when the food and drink arrives at the any of the plurality of customer seats designated as the conveyance destination,
   wherein when the predetermined location is designated as a conveyance destination of the food and drink placed on the belt conveyor, the control unit stops the belt conveyor at a timing when the food and drink arrives at the predetermined location designated as the conveyance destination and raises the food and drink by the lifting device, and
   wherein in a state where a first food and drink conveyed to the predetermined location is raised by the lifting device to be away from the belt conveyor, the control unit operates the belt conveyor when a conveyance start operation in which a second food and drink different from the first food and drink is conveyed is performed, and starts conveying the second food and drink.

3. An ordered food and drink conveyance apparatus comprising,
   a belt conveyor that forms a conveyance path from a restaurant kitchen side to a customer seat floor side, a plurality of customer seats being arranged along the conveyance path;
   a lifting device that is disposed at a predetermined location in an end point or a middle of the conveyance path and that raises food and drink placed on the belt conveyor to separate the food and drink from the belt conveyor; and
   a control unit that controls the belt conveyor and the lifting device,
   wherein when any of the plurality of customer seats is designated as a conveyance destination of the food and drink placed on the belt conveyor, the control unit stops the belt conveyor at a timing when the food and drink arrives at the any of the plurality of customer seats designated as the conveyance destination,
   wherein when the predetermined location is designated as a conveyance destination of the food and drink placed on the belt conveyor, the control unit stops the belt conveyor at a timing when the food and drink arrives at the predetermined location designated as the conveyance destination and raises the food and drink by the lifting device, wherein the belt conveyor includes a plurality of the belt conveyors in parallel, wherein the lifting device pushes up a food and drink placed as to straddle the plurality of belt conveyors from below and separates the food and drink from the plurality of belt conveyors, and wherein when in a case where the food and drink placed as to straddle the plurality of belt conveyors, the control unit makes accept an operation for designating the predetermined location as a conveyance destination and makes move the plurality of belt conveyors synchronous, and when in a case where the food and drink is not placed as to straddle the plurality of belt conveyors, the control unit makes reject an operation for designating the predetermined location as a conveyance destination and makes move the plurality of belt conveyors asynchronous.

\* \* \* \* \*